United States Patent
Bhat et al.

(10) Patent No.: US 9,668,183 B2
(45) Date of Patent: May 30, 2017

(54) SYSTEM AND METHOD FOR ENABLING QUICK RECOVERY OF SERVICES FROM A FORBIDDEN PLMN

(71) Applicant: Samsung Electronics Co., Ltd., Gyeonggi-do (KR)

(72) Inventors: Bharat Vinayak Bhat, Bangalore (IN); Nitin Jain, Bangalore (IN); Subhasish Karmakar, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/843,461

(22) Filed: Sep. 2, 2015

(65) Prior Publication Data

US 2016/0066235 A1 Mar. 3, 2016

(30) Foreign Application Priority Data

Sep. 2, 2014 (IN) .......................... 4275/CHE/2014
Apr. 21, 2015 (IN) .......................... 4275/CHE/2014

(51) Int. Cl.
*H04W 36/14* (2009.01)
*H04W 36/00* (2009.01)
*H04W 48/02* (2009.01)

(52) U.S. Cl.
CPC ........ *H04W 36/14* (2013.01); *H04W 36/0083* (2013.01); *H04W 48/02* (2013.01)

(58) Field of Classification Search
CPC ........................... H04W 36/14; H04W 76/046
USPC ........................................................ 455/436
See application file for complete search history.

(56) References Cited

U.S. PATENT DOCUMENTS

| 2002/0119776 | A1* | 8/2002 | Vestergaard | .......... | H04W 60/04 455/436 |
| 2009/0047960 | A1* | 2/2009 | Gunnarsson | ......... | H04J 11/0093 455/436 |
| 2012/0171993 | A1 | 7/2012 | Tiwari | | |
| 2014/0038592 | A1* | 2/2014 | Hietalahti | ............. | H04W 60/04 455/432.1 |

* cited by examiner

*Primary Examiner* — Muthuswamy Manoharan
(74) *Attorney, Agent, or Firm* — The Farrell Law Firm, P.C.

(57) ABSTRACT

Methods and apparatuses are provided for providing service recovery at a user equipment (UE) of a mobile communication network. The UE establishes a call in a first public land mobile network (PLMN). A handover zone of the first PLMN and a second PLMN is entered. The second PLMN is in a forbidden PLMN list of the UE. The UE receives a dedicated message with an indication of the second PLMN. The second PLMN is removed from the forbidden PLMN list. The UE performs registration with the second PLMN so that services of the second PLMN are available to the UE.

18 Claims, 4 Drawing Sheets

SYSTEM AND METHOD FOR ENABLING QUICK RECOVERY OF SERVICES FROM A FORBIDDEN PLMN

PRIORITY

This application claims priority under 35 U.S.C. §119(a) to an Indian Provisional Application filed on Sep. 2, 2014 in the Indian Intellectual Property Office and assigned Serial No. 4275/CHE/2014, and an Indian Complete Application filed on Apr. 21, 2015 in the Indian Intellectual Property Office and assigned Serial No. 4275/CHE/2014, the contents of which are incorporated herein by reference.

BACKGROUND

1. Field of the Disclosure

The present disclosure relates a system and method for enabling the recovery of services for a user equipment (UE) from a forbidden public land mobile network (PLMN) in a mobile communication system.

2. Description of Related Art

In a typical mobile communication environment, a UE may communicate voice and/or data signals with one or more service networks via cellular stations of the service networks. With the advancement of wireless communications, machine type communication (MTC) has been developed, which enables remote machines to exchange information and operate without human interaction. MTC sensors may be employed to monitor the operations and report measurement results back to service networks via wireless communication networks. The wireless communication between the UE and the service networks may be in compliance with various wireless technologies, such as, for example, global system for mobile communications (GSM) technology, general packet radio service (GPRS) technology, enhanced data rates for global evolution (EDGE) technology, wideband code division multiple access (WCDMA) technology, long term evolution (LTE) technology, LTE-Advanced technology, and others.

In the cellular communication networks, service networks broadcasting their PLMN identities (IDs). The UEs may carry out automatic network selection based on preferences of the PLMN IDs stored in a GSM subscriber identity module (SIM) or a universal subscriber identity module (USIM). In the automatic selection mode, the UE selects a PLMN from a preferred PLMN list in a predetermined priority order. Typically, the UE also includes a forbidden list, which includes PLMN IDs that are not permitted to be used under normal data service conditions. Conventionally, the UE may remove any PLMN ID from the preferred PLMN list, that is also present in the forbidden list, before network selection, so that the UE may not select the forbidden PLMN for normal data services.

FIG. 1 is a diagram illustrating a handover zone between a first PLMN, PLMN A and a second PLMN, PLMN B. A UE 102 previously added PLMN B 106 in a forbidden PLMN list. Thus, while in PLMN A 104 region, the PLMN B 106 is forbidden for UE 102. The UE 102 is mobile and establishes a circuit switching/packet switching (CS/PS) call in the PLMN A 104. The UE 102 enters into handover zone 108 of the PLMN A 104 and the PLMN B 106, where the PLMN A 104 can give a handover command to the UE 102 to go to the PLMN B 106, which has a roaming agreement with the PLMN A 104.

FIG. 2 is a diagram illustrating representing a UE that does not trigger a circuit switched/packet switched (CS/PS) registration procedure upon receiving a forbidden PLMN in a dedicated message.

Referring to FIG. 2, for example, the present disclosure assumes that the UE has a "forbidden PLMN list" 210 or a "forbidden PLMNs for GPRS service" list, wherein the "forbidden PLMN list" 210 or "forbidden PLMNs for GPRS service" list includes PLMN A 212 as the UE's home PLMN on Network 1 206, PLMN B 214 of Network 2 208. In step 213a, the UE transmits a CS/PS call request to the RRC 204 through the NAS 202, and in step 213b, the RRC 204 transmits the CS/PS call request to the Network 1 206. In step 216, the UE establishes a CS/PS call in the PLMN A 212 through non-access stratum (NAS) 202 in mobility of the UE.

In step 218, the UE enters into a handover zone of the PLMN A 212 and the PLMN B 214 through radio resource controller (RRC) 204. The PLMN B 214 is indicated through the RRC 204 dedicated signaling. In step 219a, the network 1 206 transmits a handover to PLMN B 214 command to the RRC 204. In step 219b, the RRC 204 notifies transmit success of the handover to the PLMN B 214. In the step 219c, the RRC 204 transmits a request to update the PLMN B 214 on the network 2 208 as the UE's home PLMN in the "forbidden PLMN list" 210 or "forbidden PLMNs for GPRS service" list. Once the handover is successful, in step 220, since the PLMN B 214 is still a forbidden PLMN, a registration procedure may not be triggered. Since the PLMN B 214 is still a forbidden PLMN, in step 222, the PLMN 214 is a roaming PLMN on a current area. In step 224, the CS/PS call ends, and, in step 226, the RRC 204 camps on the PLMN B 214. In the 227, the RRC 204 transmits PLMN B 208 available indication to the NAS 202. In step 228, even though the PLMN B 214 is available, the UE assumes that the PLMN B 214 is still a forbidden PLMN and registration procedure may not be triggered. The UE may be in limited service in the PLMN B 214 after the service is ended. This may unnecessarily delay the services of PLMN B to the user. In step 230, the PLMN B 214 is still the roaming PLMN in current area.

With the existing approach, the UE cannot access the communication services in the PLMN B since the PLMN B is in a forbidden PLMN list, even though the PLMN B has a roaming agreement with the PLMN A. When the PLMN B is forbidden, the UE starts a "Forbidden PLMN list deletion timer", and the PLMN B is not available until the timer expires or until the PLMN B is manually selected. The situation may worsen when there is no PLMN available in a particular area other than PLMN B. In such a case, the UE may remain in a state of limited service until the forbidden PLMN lists are erased. This further unnecessarily delays the services of PLMN B to the user.

SUMMARY

An aspect of the disclosure provides a system and a method that enables a UE to access a service network associated with an available PLMN that was previously in the forbidden PLMN list.

According to one aspect of the disclosure, a method is provided for providing service recovery at a UE of a mobile communication network. The UE establishes a call in a first PLMN. A handover zone of the first PLMN and a second PLMN is entered. The second PLMN is in a forbidden PLMN list of the UE. The UE receives a dedicated message with an indication of the second PLMN. The second PLMN is removed from the forbidden PLMN list. The UE performs registration with the second PLMN so that services of the second PLMN are available to the UE.

According to another aspect of the disclosure, a UE of a mobile communication network is provided. The UE includes a memory. The UE also includes a processor coupled to the memory and configured to establish a call in a first PLMN, remove a second PLMN from a forbidden PLMN list upon entering a handover zone of the first PLMN and the second PLMN and receiving a dedicated message with an indication of the second PLMN, and performing registration with the second PLMN so that services of the second PLMN are available to the UE. The UE further includes a transceiver coupled to the processor and configured to receive the dedicated message.

According to another aspect of the disclosure, a method is provided for providing service recovery at an RRC of a mobile communication network. The RRC establishes a call for a UE in a first PLMN. The RRC receives a handover command upon entry of the UE into a handover zone of the first PLMN and a second PLMN. The RRC transmits a dedicated message with an indication of the second PLMN to the UE, enabling the UE to remove the second PLMN from a forbidden PLMN list and perform registration with the second PLMN.

BRIEF DESCRIPTION OF THE DRAWINGS

The above and other aspects, features, and advantages of embodiments described herein may be more apparent from the following detailed description when taken in conjunction with the accompanying drawings, in which.

DETAILED DESCRIPTION

Figure 1:
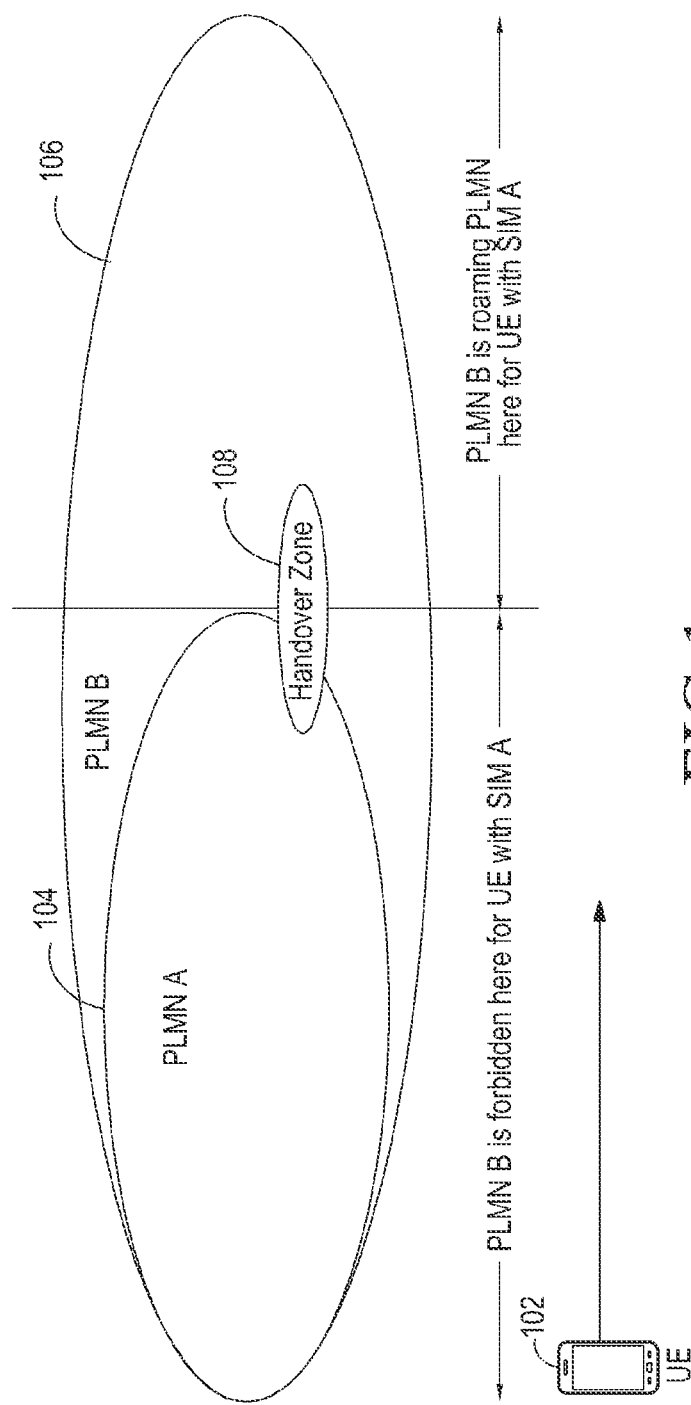
FIG. 1 is a diagram illustrating a handover zone between two PLMNs.
Figure 2:
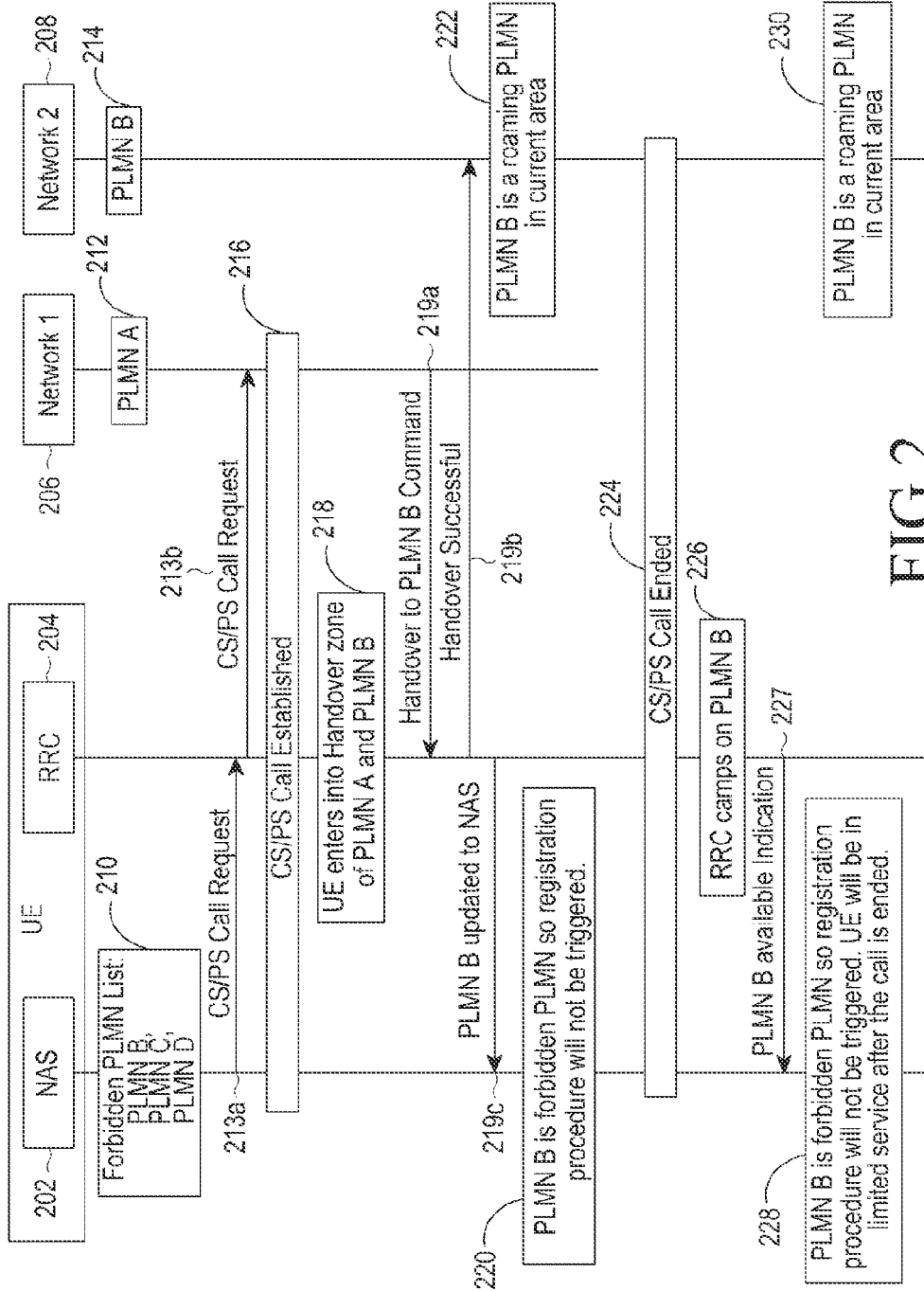
FIG. 2 is a flow diagram illustrating a method in which a UE does not trigger a CS/PS registration procedure upon receiving a forbidden PLMN in a dedicated message.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter described herein.

As used herein, references to "an", "one", or "some" embodiment(s) does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It may be further understood that the terms "includes", "comprises", "including", and/or "comprising", when used herein, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meanings as those commonly understood by one of ordinary skill in the art to which this disclosure pertains. It may be further understood that terms, such as those defined in commonly used dictionaries, should be interpreted as having meanings that are consistent with their meanings in the context of the relevant art, and may not be interpreted in an idealized or overly formal sense unless expressly so defined herein.

The various embodiments disclose a system and method for quick recovery of services from a forbidden PLMN. According to an embodiment, the method provides for recovering services (CS/PS) to a UE from a PLMN, which was previously forbidden. Also, the UE need not wait for the "Forbidden PLMN list deletion timer" to expire.

Figure 3:
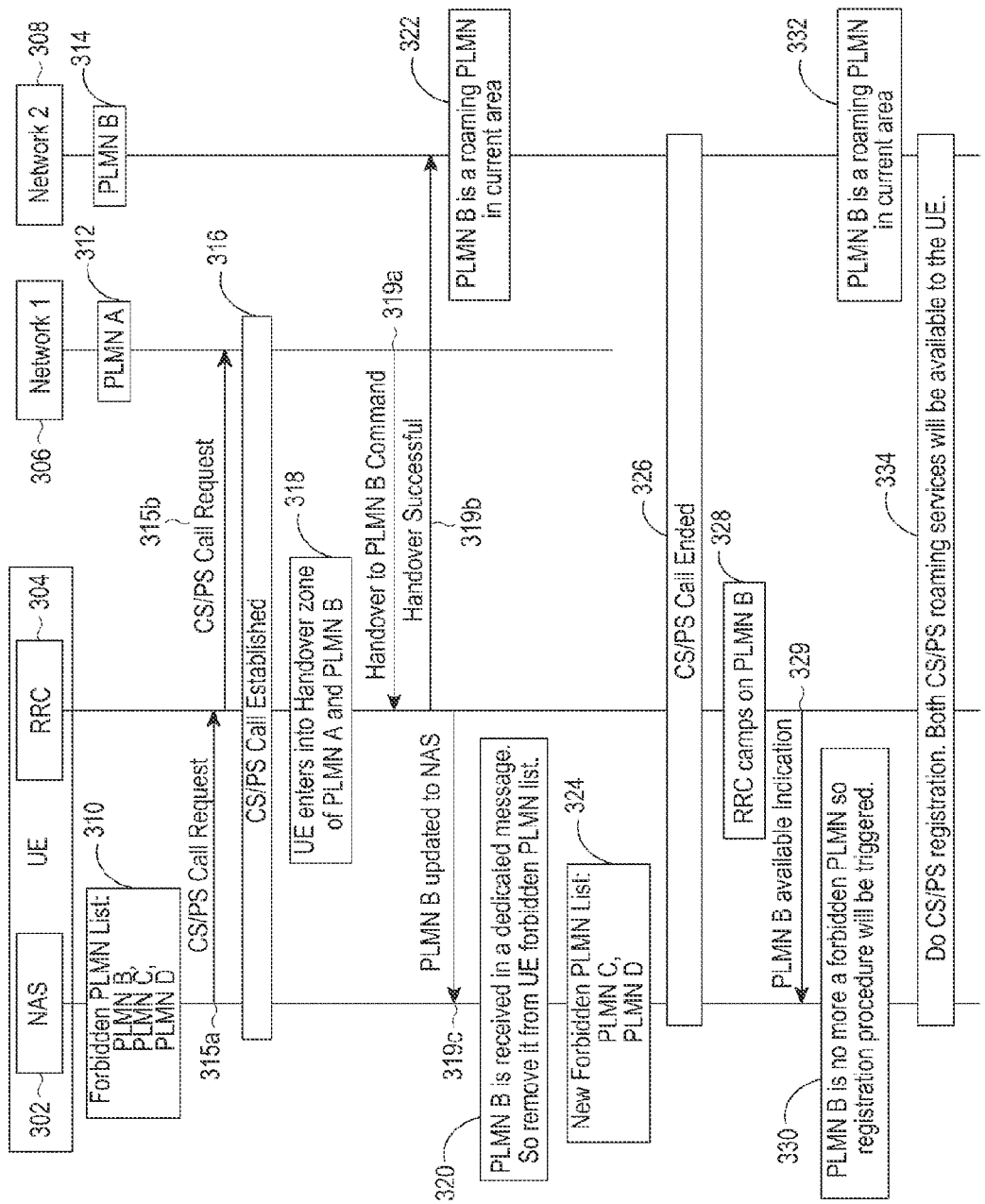
FIG. 3 is a flow diagram illustrating a method of recovering CS/PS services from a forbidden PLMN by the UE, according to an embodiment of the present disclosure.

FIG. 3 is a flow diagram illustrating a method of recovering CS/PS services from a forbidden PLMN, according to an embodiment of the present disclosure.

Referring to FIG. 3, for example, the present disclosure assumes that the UE has a "forbidden PLMN list" 310 or a "forbidden PLMNs for GPRS service" list. The UE is configured with a first PLMN, PLMN A 312 as the UE's home PLMN, which is on a first network, Network 1 306. The UE is configured with a second PLMN, PLMN B 314, of a second network, Network 2 308. The "forbidden PLMN list" 310 or a "forbidden PLMNs for GPRS service" list comprises the PLMN A 312 and B 314. In step 215a, the UE transmits a CS/PS call request to the RRC 304 through the NAS 302, and in the step 315b, the RRC 304 transmit the CS/PS call request to the Network 1 306. In step 316, the UE establishes a CS/PS call in the PLMN A 312 through NAS 302. In step 318, the UE enters into a handover zone of the PLMN A 312 and the PLMN B 314 through radio resource controller (RRC) 304, and the PLMN B 314 is indicated through RRC 304 dedicated signaling. In step 319a, the network 1 306 transmits a handover to PLMN B 314 command to the RRC 304. In step 319b, the RRC 304 notifies transmit success of the handover to the PLMN B 314. And in the step 319c, the RRC 304 transmits a request to update the PLMN B 314 on the network 2 308 as the UE's home PLMN in the "forbidden PLMN list" 310 or "forbidden PLMNs for GPRS service" list. Once the handover is successful, in step 320, the PLMN B 314 is received in a dedicated message, and the PLMN B 314 is removed from the forbidden PLMN list 310. A new forbidden PLMN list 324 is created without the PLMN B 314. In step 322, the PLMN 314 is a roaming PLMN on a current area, In step 326, the CS/PS call ends. In step 328, the RRC 304 camps on the PLMN B 314. In the step 329, the RRC 304 transmits PLMN B 308 available indication to the NAS 302. In step 330, CS/PS registration is triggered since it is determined that the PLMN B 314 is no longer a forbidden PLMN. In step 332, the PLMN B 314 is still is the roaming PLMN in current area. In step 334, the UE performs CS/PS registration and the UE is able to access both the CS/PS roaming services.

According to another embodiment, if the service network wishes to move the UE (through a redirection order, a cell change order, or any other mobility command) to an area of the forbidden PLMN B, the service network adds the identity of PLMN B along with the redirection information in the indication message. If the UE receives the dedicated PLMN B in a redirection order or cell change order and if the PLMN B is part of the UE forbidden list, then UE removes the PLMN B from the forbidden PLMN list.

Figure 4:
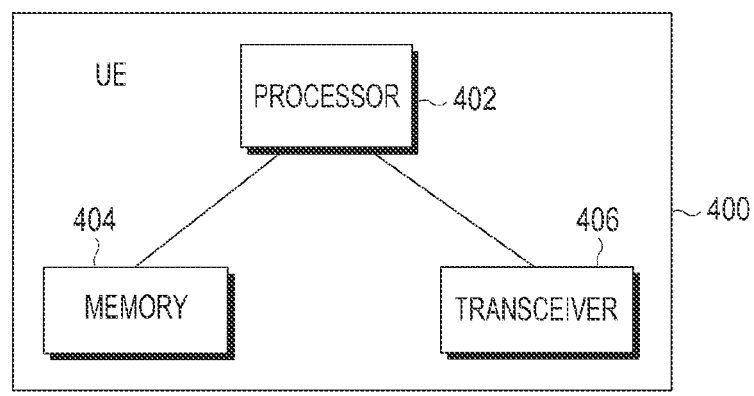
FIG. 4 is a block diagram illustrating UE recovering CS/PS services from a forbidden PLMN, according to an embodiment of the present disclosure.

FIG. 4 is a block diagram illustrating UE recovering CS/PS services from a forbidden PLMN, according to an embodiment of the present disclosure.

Referring to FIG. 4, for example, the present disclosure assumes that the UE 400 comprises a processor 402, a memory 404 and a transceiver 406.

The processor 402 coupled to the memory 404 and configured to establish a call in a first PLMN (e.g., the PLMN A 312 of FIG. 3), remove a second PLMN (e.g., the PLMN B 314 of FIG. 3) from a forbidden PLMN list upon entering a handover zone of the first PLMN and the second PLMN and receiving a dedicated message with an indication of the second PLMN, and performing registration with the second PLMN so that services of the second PLMN are available to the UE.

The transceiver 406 coupled to the processor 402 and configured to receive the dedicated message. The transceiver 406 transmits a CS/PS call request from the UE to the first PLMN via a RRC for establishing the call. The dedicated message is received from an RRC in response to a command to handover to the second PLMN from the first PLMN.

The processor 402 generates a new forbidden PLMN list without the second PLMN during removing the second PLMN. The processor 402 ends the established call after removing the second PLMN from the forbidden PLMN list. Then an RRC camps on the second PLMN when the established call is ended. The second PLMN is a roaming PLMN and the services of the second PLMN are roaming services. The forbidden PLMN list is stored in a subscriber identity module (SIM) or internal memory of the UE.

An illustrative hardware implementation of a computing system may be implemented in accordance with a processor, a memory, input/output (I/O) devices, and a network interface, coupled via a computer bus or alternate connection arrangement.

It is to be appreciated that the term "processor", as used herein, is intended to include any processing device, such as, for example, one that includes a central processing unit (CPU) and/or other processing circuitry. It is also to be understood that the term "processor" may refer to more than one processing device and that various elements associated with a processing device may be shared by other processing devices.

The term "memory", as used herein, is intended to include memory associated with a processor or CPU, such as, for example, random access memory (RAM), read only memory (ROM), a fixed memory device (e.g., hard drive), a removable memory device (e.g., diskette), flash memory, etc.

The phrase "network interface", as used herein, is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The present embodiments may be utilized in conjunction with the manufacture of integrated circuits, systems on chips, or chip sets. In general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this disclosure.

Embodiments disclosed herein ensure that the user is enabled to access the CS and PS services of the forbidden PLMN as soon as the network provides an indication to the UE, rather than waiting for the user to manually select the forbidden PLMN or waiting for a forbidden PLMN list deletion timer to expire. The embodiments are applicable to forbidden location areas.

Various devices, modules, and the like described herein may be enabled and operated using hardware circuitry, for example, complementary metal oxide semiconductor based logic circuitry, firmware, software and/or any combination of hardware, firmware, and/or software embodied in a machine readable medium.

While certain embodiments have been shown and described, it may be understood by those skilled in the art that various changes in form and detail may be made therein without departing from the spirit and scope of the disclosure as defined by the appended claims.

What is claimed is:

1. A method for providing service recovery at a user equipment (UE) of a mobile communication network, the method comprising:
   establishing, by the UE, a call in a first public land mobile network (PLMN);
   entering a handover zone of the first PLMN and a second PLMN, wherein the second PLMN is in a forbidden PLMN list of the UE;
   receiving a command for handover to the second PLMN from the first PLMN;
   performing the handover to the second PLMN from the first PLMN, and receiving, at the UE, a dedicated message with an indication of the second PLMN, in response to the received command;
   removing the second PLMN from the forbidden PLMN list, in response to receiving the dedicated message;
   ending the established call, in response to the second PLMN being removed from the forbidden PLMN list; and
   performing, by the UE, registration with the second PLMN, if the established call ends, so that services of the second PLMN are available to the UE.

2. The method of claim 1, wherein establishing the call comprises transmitting a circuit switching/packet switching (CS/PS) call request from the UE to the first PLMN via a radio resource controller (RRC).

3. The method of claim 1, wherein the dedicated message is received from a radio resource controller (RRC) in response to receiving the command for the handover to the second PLMN from the first PLMN.

4. The method of claim 1, wherein removing the second PLMN comprises generating a new forbidden PLMN list without the second PLMN.

5. The method of claim 1, wherein a radio resource controller (RRC) camps on the second PLMN when the established call is ended.

6. The method of claim 1, wherein the second PLMN is a roaming PLMN and the services of the second PLMN are roaming services.

7. The method of claim 1, wherein an indication of a successful handover is transmitted from a radio resource controller (RRC) to the second PLMN.

8. The method of claim 1, wherein the forbidden PLMN list is stored in a subscriber identity module (SIM) or an internal memory of the UE.

9. A user equipment (UE) of a mobile communication network, the UE comprising:
   a memory;
   a transceiver; and
   a processor configured to:
      establish a call in a first public land mobile network (PLMN),
      enter a handover zone of the first PLMN and a second PLMN, wherein the second PLMN is in a forbidden PLMN list of the UE,
      receive a command for handover to the second PLMN from the first PLMN,
      perform the handover to the second PLMN from the first PLMN, and receive, via the transceiver, a dedicated message with an indication of the second PLMN, in response to the received command,
      remove the second PLMN from a forbidden PLMN list, in response to receiving the dedicated message,
      end the established call, in response to the second PLMN being removed from the forbidden PLMN list, and
      perform registration with the second PLMN, if the established call ends, so that services of the second PLMN are available to the UE.

10. The UE of claim 9, wherein the transceiver is configured to transmit a circuit switching/packet switching (CS/PS) call request to the first PLMN via a radio resource controller (RRC) for establishing the call.

11. The UE of claim 9, wherein the dedicated message is received from a radio resource controller (RRC) in response to receiving the command for the handover to the second PLMN from the first PLMN.

12. The UE of claim 9, wherein the processor is further configured to generate a new forbidden PLMN list without the second PLMN while removing the second PLMN.

13. The UE of claim 9, wherein a radio resource controller (RRC) camps on the second PLMN when the established call is ended.

14. The UE of claim 9, wherein the second PLMN is a roaming PLMN and the services of the second PLMN are roaming services.

15. The UE of claim 9, wherein an indication of a successful handover is transmitted from a radio resource controller (RRC) to the second PLMN.

16. The UE of claim 9, wherein the forbidden PLMN list is stored in a subscriber identity module (SIM) or an internal memory of the UE.

17. A method for providing service recovery at a radio resource controller (RRC) of a mobile communication network, the method comprising:
   establishing, by the RRC, a call for a user equipment (UE) in a first public land mobile network (PLMN);
   receiving, by the RRC, a handover command upon entry of the UE into a handover zone of the first PLMN and a second PLMN;
   receiving a command for handover to the second PLMN from the first PLMN;
   performing the handover to the second PLMN from the first PLMN, and transmitting, by the RRC, a dedicated message with an indication of the second PLMN to the UE, in response to the received command, the dedicated message instructing the UE to remove the second PLMN from a forbidden PLMN list and perform registration with the second PLMN; and
   ending the established call, in response to the second PLMN being removed from the forbidden PLMN list.

18. The method of claim 17, wherein the RRC camps on the second PLMN when the established call is ended.

* * * * *